(No Model.)
J. W. CALEF.
SHOVEL.
No. 339,527. Patented Apr. 6, 1886.
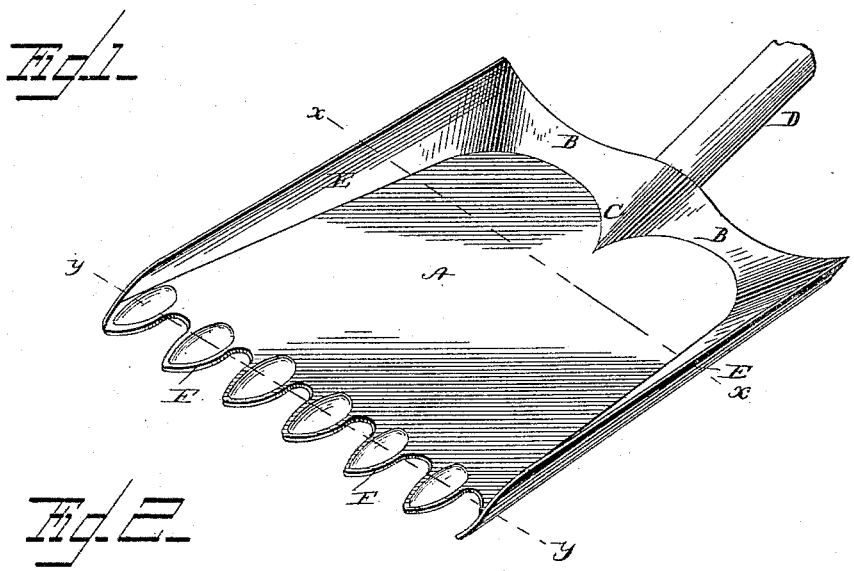
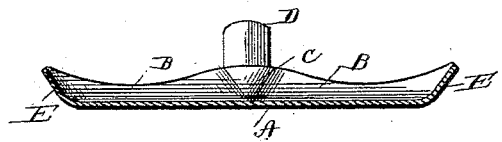
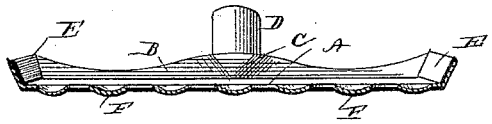
WITNESSES
F. L. Ourand
A. L. Morsell
Joseph W. Calef
INVENTOR
By Louis Bagger & Co.
Attorneys.

United States Patent Office.

JOSEPH WARREN CALEF, OF NORTH EASTON, MASSACHUSETTS, ASSIGNOR OF ONE-HALF TO CHARLES S. CORFIELD, OF PHILADELPHIA, PA.

SHOVEL.

SPECIFICATION forming part of Letters Patent No. 339,527, dated April 6, 1886.

Application filed July 27, 1885. Renewed February 17, 1886. Serial No. 192,301. (No model.)

*To all whom it may concern:*

Be it known that I, JOSEPH WARREN CALEF, a citizen of the United States, and a resident of North Easton, in the county of Bristol, and State of Massachusetts, have invented certain new and useful Improvements in Shovels; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved shovel. Fig. 2 is a cross-section on line *x x*, Fig. 1; and Fig. 3 is a similar view on line *y y*, same figure.

Similar letters of reference indicate corresponding parts in all the figures.

My invention has relation to that class of shovels which have the lower edge serrated or provided with projecting teeth; and it consists in the improved construction and combination of parts of the same, as hereinafter more fully described and claimed.

In the accompanying drawings, the letter A indicates the shovel-blade. The upper portion of this blade is formed with a slightly-upturned flange, B, the middle of which merges into a longitudinal rib, C, extending a short distance into the blade, and having the socket D for the handle extending from its upper end. The side edges, E, of the blade are bent up to form flanges, and the lower edge of the blade is serrated or formed with teeth F, which are spoon-shaped and have their concave sides facing upward. The spoon-shaped teeth are pointed, and their edges are sharp, and are raised above the bottoms of the concave teeth around the entire teeth.

The sharp teeth will serve to ease the introduction of the shovel in the material in which it is used, and the spoon shape of the teeth will aid in the retention of the material gathered upon the shovel.

When the shovel is used for digging purposes, it will be seen that the rounded under sides of the spoon-shaped teeth will allow the shovel to glide over pebbles or other stones in the ground, preventing them from being caught between the teeth, and the pointed teeth with their sharp edges will work easily through the soil, the edges of each tooth cutting with an oblique cut.

The edges of the teeth will wear themselves sharp, as the greatest friction and wear upon the shovel will come upon the upper side, and the upper side of the blade wearing, the upper sides of the edges will be worn at an acute angle to the under sides of the teeth, thus causing the edges to be sharpened.

As a digging implement, the shovel will work itself easily into the ground, and the teeth upon its lower edge will be useful as clod-breakers, their points being capable of entering a hard clod and breaking it, and at the same time they may also serve as rake-teeth, to smooth the surface of the ground.

The spoon shape of the teeth will serve to strengthen the teeth, and consequently the lower edge of the shovel, the concavo-convex form of the teeth rendering them strong and giving them great resistance for longitudinal strain.

The raised edges or flanges around the sides of the blade will enable the shovel to hold a quantity of material, when used for shoveling, and the bulged and serrated lower edge of the blade will allow the shovel to scrape close to the floor or surface upon which the material to be shoveled rests, the said material being forced up between the teeth of the edge and gradually forced upon the teeth and in upon the shovel-blade.

Having thus described my invention, I claim and desire to secure by Letters Patent of the United States—

1. A shovel having its lower edge provided with teeth which are concavo-convex or dishing, substantially as and for the purpose set forth.

2. A shovel having the lower edge cut out to form teeth tapering toward their points and concavo-convex in shape, having their concave sides facing upward, as and for the purpose shown and set forth.

3. A shovel having its upper and side edges raised to form flanges, and having its lower edge cut out to form teeth tapering toward their points and concavo-convex or spoon-shaped, with their concave sides facing upward, as and for the purpose shown and set forth.

4. A shovel having its upper side edges formed with flanges and the lower edge provided with teeth, which are tapering, concavo-convex, and sharpened, substantially as described.

In testimony that I claim the foregoing as my own I have hereunto affixed my signature in presence of two witnesses.

JOSEPH WARREN CALEF.

Witnesses:
HARRY T. MINCHEW,
JOSEPH DONNELLY.